United States Patent [19]
Iwasa et al.

[11] Patent Number: 4,686,122
[45] Date of Patent: Aug. 11, 1987

[54] RUBBER ADHESIVE

[75] Inventors: Tadanobu Iwasa; Hiroshi Yokoi, both of Aichi, Japan

[73] Assignee: Toyoda Gosei Co., Ltd., Nishikasugai, Japan

[21] Appl. No.: 896,578

[22] Filed: Aug. 18, 1986

Related U.S. Application Data

[63] Continuation of Ser. No. 746,545, Jun. 19, 1985, abandoned.

[30] Foreign Application Priority Data

Jun. 25, 1984 [JP] Japan .................. 59-130623

[51] Int. Cl.$^4$ .......................... B32B 15/04; B05D 3/02
[52] U.S. Cl. ................... 427/388.3; 427/409; 428/457; 428/460; 428/462
[58] Field of Search .............. 428/457, 460, 462; 427/409, 388.3

[56] References Cited

U.S. PATENT DOCUMENTS

| | | | |
|---|---|---|---|
| 2,538,047 | 1/1951 | Sanders et al. | 524/202 |
| 2,615,059 | 10/1952 | Bemmels | 524/203 |
| 3,086,955 | 4/1963 | Leminszka et al. | 260/41.5 |
| 3,429,769 | 2/1969 | Ippen et al. | 428/462 |
| 3,534,123 | 10/1970 | Bostock et al. | 524/202 |
| 3,649,542 | 3/1972 | Hasebe et al. | 524/202 |
| 3,911,130 | 11/1976 | Cowell et al. | 428/462 |
| 4,181,648 | 1/1980 | Honsberg | 524/576 |
| 4,182,639 | 1/1980 | Pignocco et al. | 427/413 |
| 4,511,628 | 4/1985 | Kang et al. | 428/462 |

FOREIGN PATENT DOCUMENTS

| | | |
|---|---|---|
| 1282940 | 11/1968 | Fed. Rep. of Germany . |
| 3505907 | 9/1985 | Fed. Rep. of Germany . |
| 1530700 | 5/1968 | France . |
| 55-86831 | 7/1980 | Japan . |
| 57-117534 | 7/1982 | Japan . |
| 58-11532 | 1/1983 | Japan . |

OTHER PUBLICATIONS

Rubber Chemistry & Technology–vol. 44, No. 4, pp. 1025–1042 (1971).

*Primary Examiner*—Veronica P. Hoke
*Attorney, Agent, or Firm*—Cushman, Darby & Cushman

[57] ABSTRACT

There is provided a rubber adhesive for bonding rubber to metal or synthetic resin. The rubber adhesive comprises a chlorinated polymer as a principal component and a dithiocarbamate. The dithiocarbamate is, for example, nickel dibutyldithiocarbamate, which is added in amount of 0.5 to 20 parts by weight, preferably 4 to 16 parts by weight, for 100 parts by weight of solids in the principal component.

2 Claims, 3 Drawing Figures

RUBBER ADHESIVE

This is a continuation of application Ser. No. 746,545, filed June 19, 1985, which was abandoned upon the filing hereof.

BACKGROUND OF THE INVENTION

1. Field of the Invention

The present invention relates to a rubber adhesive for bonding rubber to an adherend.

2. Description of the Prior Art

There are two common methods for bonding rubber and metal to each other as illustrated in FIGS. 2 and 3 in the accompanying drawing. According to the first method shown in FIG. 2, a primer (23) composed mainly of phenolic resin is applied to the adherend surface (21a) of a metal (21). After the primer (23) has been dried, a rubber adhesive (24) composed mainly of chlorinated rubber is applied to the dried primer. On the rubber adhesive (24) is placed vulcanized or unvulcanized rubber (25), which is thereafter pressed with heating, whereby bonding is made between metal (21) and rubber (25). According to the second method shown in FIG. 3, an adhesive (26) containing both the above-mentioned primer and the rubber adhesive is applied directly to the adherend surface (21a) of the metal substrate (21), followed by drying. On the dried adhesive is placed vulcanized or unvulcanized rubber (25), which is thereafter pressed with heating in the same manner as in the first method, whereby bonding is made between metal (21) and rubber (25).

The above-mentioned two common methods that employ the rubber adhesive (24) or (26) do not provide bonding between rubber (25) and metal (21) with sufficiently high adhesive strength. This holds true particularly in the case where IIR (butyl rubber), Cl-IIR (chlorinated butyl rubber), or EPDM (ethylene-propylene rubber) is to be bonded. In addition, for these kinds of rubber, the common methods require a long time for the pressing and heating steps.

SUMMARY OF THE INVENTION

It is an object of this invention to provide a rubber adhesive which bonds rubber to an adherend with a high adhesive strength.

It is another object of this invention to provide a rubber adhesive which sets faster than the conventional one or requires a shorter pressing time and heating time.

The object of this invention is achieved with a rubber adhesive composed of chlorinated polymer as a principal component and a dithiocarbamate.

These objects together with other features and advantages not specifically mentioned will become clear to those skilled in the art from the detailed description and examples which follow.

DESCRIPTION OF THE PREFERRED EMBODIMENTS

The invention is now described in more detail with reference to the preferred embodiments.

The rubber adhesive of this invention is composed of chlorinated rubber as a principal component and a dithiocarbamate. In an example of this invention, the chlorinated rubber is S.L-920 (a product of Sakai Chemical Industry Co., Ltd.) and the dithiocarbamate is nickel dibutyldithiocarbamate, which is originally used as an anti-oxidant. Nickel dibutyldithiocarbamate is added in anamount of 0.5 to 20 parts by weight, preferably 4 to 16 parts by weight, for 100 parts by weight of solids in S.L-920. These two components are described in the following.

S.L-920 is an adhesive for IIR (butyl rubber) and EPDM (ethylene-propylene rubber). It is composed chiefly of Cl-EPDM (chlorinated ethylene-propylene rubber) containing about 18% of chlorine. It also contains carbon black and a small amount of cross-linking agent. Because of this composition, S.L-920 is good in heat resistance and ozone resistance, and has long been considered to require no anti-oxidant.

Nickel dibutyldithiocarbamate is used for the inhibition of sun-checking and ozone cracking. Usually, it is added in an amount of 0.5 to 3 parts by weight for 100 parts by weight of rubber. It is effective for SBR (styrene butadiene rubber), NBR (nitrile rubber), and CR (chloroprene rubber).

Therefore, the feature of this invention resides in the fact that a rubber adhesive which has been considered to require no anti-oxidant is positively incorporated with a dithiocarbamate.

To evaluate the performance of the rubber adhesive used in this example, the bond strength was measured and the failure characteristics were observed for the test piece of metal and rubber bonded to each other.

Figure 1:
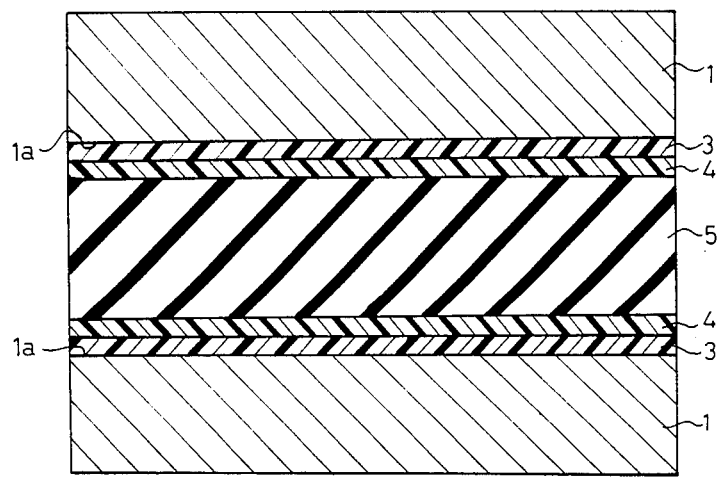
FIG. 1 is a sectional view of a metal-rubber assembly bonded with the rubber adhesive of this invention.
Figure 2:
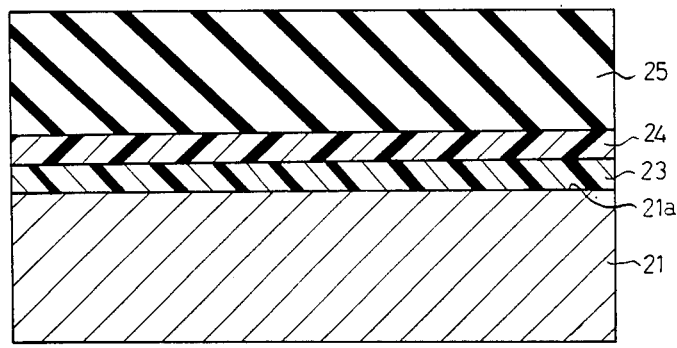
FIGS. 2 and 3 are sectional views of metal-rubber assemblies bonded by the conventional methods.
Figure 3:
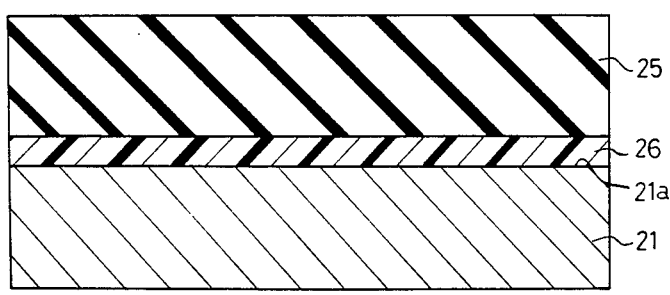

The test piece as shown in FIG. 1 was prepared in the following manner.

(a) The adherend surface (1a) of the metal plate (1) is cleansed of grease etc. with trichloroethylene.

(b) The adherend surface (1a) is slightly roughened by grit blasting.

(c) The adherend surface (1a) is coated by spraying with S.L-929P (a product of Sakai Chemical Industry, Co., Ltd.) as a primer (3). The primer is dried at 50° C. for 10 minutes.

(d) The rubber adhesive (4) of this invention is applied by spraying to the primer (3), followed by drying at 50° C. for 10 minutes.

(e) A rubber piece (5) is interposed between two pieces of the metal plate (1) prepared as mentioned above. The rubber piece (5) and the metal plate (1) are bonded to each other through vulcanization by pressing with heating at 160° C. for 20 minutes. The rubber piece (5) is prepared from unvulcanized chlorinated butyl rubber, the recipe of which is shown in Table 1 below.

TABLE 1

| Compounding ingredient | Compounding ratio (phr) |
| --- | --- |
| Chlorobutyl rubber | 100 |
| Stearic acid | 1 |
| HAF carbon | 90 |
| Naphthenic process oil | 20 |
| Zinc oxide | 5 |
| Vulcanization accelerator EU* | 3 |

*Ethylene thiourea

The test piece thus prepared was examined for bond strength between metal and rubber and for failure characteristics on a universal tester. In the test, the two metal pieces (1) were chucked and pulled apart at a rate of 50 mm/min. The results are shown in Table 2.

TABLE 2

| Example | NBC (in parts by weight) for 100 parts by weight of solids in adhesive | Adhesion properties | |
|---|---|---|---|
| | | Bond strength (kg/cm$^2$) | Failure R/RC/CP/M |
| Comparative Example 1 | 0 | 15 | 0/5/95/0 |
| Example 1 | 0.5 | 18 | 0/50/50/0 |
| Example 2 | 1 | 22 | 5/95/0/0 |
| Example 3 | 2 | 24 | 20/80/0/0 |
| Example 4 | 4 | 27 | 30/70/0/0 |
| Example 5 | 8 | 28 | 15/85/0/0 |
| Example 6 | 12 | 27 | 100/0/0/0 |
| Example 7 | 16 | 29 | 100/0/0/0 |
| Example 8 | 20 | 23 | 100/0/0/0 |
| Comparative Example 2 | 30 | 19 | 95/5/0/0 |

For comparison, the same experiment as above was carried out in which the dithiocarbamate was replaced by N-phenyl-N'-isopropyl-p-phenylenediamine in varied amounts. (This compound is an anti-oxidant sold by Ouchi Shinko Chemical Industrial Co., Ltd. under a trade name of NOCRAC 810 NA.) The results are shown in Table 3.

TABLE 3

| Example | NOCRAC 810 NA (in parts by weight) for 100 parts by weight of solids in adhesive | Adhesion properties | |
|---|---|---|---|
| | | Bond strength (kg/cm$^2$) | Failure R/RC/CP/M |
| Comparative Example 1 | 1 | 13 | 0/3/97/0 |
| Comparative Example 2 | 2 | 11 | 0/0/100/0 |
| Comparative Example 3 | 4 | 10 | 0/0/90/10 |
| Comparative Example 4 | 8 | 7 | 0/0/80/20 |

The abbreviations in Tables 2 and 3 stand for the following;
NBC: Nickel dibutyldithiocarbamate
R: Failure of rubber
RC: Failure at the interface between rubber and adhesive
CP: Failure at the interface between adhesive and primer
M: Failure at the interface between primer and metal An ideal of the failure characteristics is 100% failure of rubber. The adhesion properties are considered to be poor if failure occurs in RC, CP, or M (poorest in the case of M). Usually, failure in rubber and failure at the interface between rubber and adhesive are acceptable for adhesion properties required.

Tables 2 and 3 apparently indicate that the adhesive of this invention is improved in bond strength between rubber and adhesive and between primer and adhesive over the conventional adhesive in which the dithiocarbamate is not incorporated or the other anti-oxidant is incorporated.

The lower limit for nickel dibutyldithiocarbamate to be added was established at 0.5 parts by weight for 100 parts by weight of solids in the adhesive, because this amount was effective in improving both bond strength and failure characteristics. (Compare Example 1 with Comparative Example 1 in Table 2.) On the other hand, the upper limit for this compound to be added was established at 20 parts by weight, because both bond strength and failure characteristics became worse when this compound was added in an amount of 30 parts by weight, and because this compound is expensive. (Compare Example 8 with Comparative Example 2 in Table 2.) Thus the most suitable amount in terms of bond strength is in the range of 4 to 16 parts by weight as demonstrated by Examples 4 to 7 in Table 2.

The above-mentioned experiments indicate that the adhesive of this invention improves not only the metal-to-primer bond strength but also the primer-to-adhesive and adhesive-to-rubber bond strength. Thus it improves the overall bond strength between metal and rubber. Moreover, it sets faster than the conventional adhesive.

The scope of this invention is not limited to the above-mentioned examples; but the following modifications will be possible.

(1) The nickel dibutyldithiocarbamate may be replaced by nickel diethyldithiocarbamate or nickel dipropyldithiocarbamate.

(2) The unvulcanized rubber may be replaced by vulcanized rubber.

(3) The adhesive of this invention, which is composed mainly of chlorinated polymer, is effective particularly for chlorinated rubber. But it is also used for nitrile rubber, ethylene-propylene rubber, and styrene-butadiene rubber.

(4) The metal plate (1) may be replaced by a synthetic resin such as polyethylene and polypropylene. (In this case, no primer is required.)

As many apparently different embodiments of this invention may be made without departing from the spirit and scope thereof, it is to be understood that the invention is not limited to the specific embodiments thereof except as defined in the appended claims.

What is claimed is:

1. A metal base adhered to a rubber through an adhesive, the improvement residing in using (1) as the first coating, a phenolic resin—based primer; (2) as the adhesive, a composition consisting of 100 parts by weight of a chlorinated ethylene propylene rubber and from 4 to 16 parts by weight of a $C_{2-4}$ nickel dithio—carbamate; and (3) as the rubber adherend, a rubber selected from the group consisting of butyl rubber, chlorinated butyl rubber, and ethylene—propylene—diene rubber.

2. A process for producing the coated article of claim 1 which comprises:
   applying the phenolic resin - based primer to the metal base and drying the primer;
   applying the rubber adhesive consisting of 100 parts by weight of the chlorinated ethylene propylene rubber and from 4 to 16 parts by weight of the $C_{2-4}$ nickel dithiocarbamate to the dried primer and drying the rubber adhesive;
   placing unvulcanized rubber consisting of a rubber selected from the group consisting of butyl rubber, chlorinated butyl rubber, and ethylene - propylene diene rubber on the dried rubber adhesive; and
   subsequently bonding the rubber to the metal through vulcanization.

* * * * *